Oct. 15, 1940.    G. NEUHAUS    2,218,434
FRICTION GEAR
Filed Feb. 23, 1937    2 Sheets-Sheet 1

SECTION 2-3

Inventor:
Gustav Neuhaus

Oct. 15, 1940.  G. NEUHAUS  2,218,434
FRICTION GEAR
Filed Feb. 23, 1937  2 Sheets-Sheet 2

Patented Oct. 15, 1940

2,218,434

UNITED STATES PATENT OFFICE 2,218,434

FRICTION GEAR

Gustav Neuhaus, Essen-Stadtwald, Germany, assignor to Askania-Werke A. G., a corporation of Germany Application February 23, 1937, Serial No. 127,235
In Germany May 25, 1935

7 Claims. (Cl. 74—285)

This invention relates to friction gears, more particularly to gears for creating and/or analysing accelerated motions.

It is an object of this invention to provide a differential friction wheel drive, thereby increasing the accuracy of the gear at low gear ratios and decreasing the wear of the friction wheels.

It is a further object of this invention to provide an improved friction gear system, for creating accelerated or retarded motions.

Further aims, objects, and advantages of this invention will appear from a consideration of the description which follows with the accompanying drawings showing embodiments of this invention for illustrative purposes. It is to be understood that this description is not to be taken in a limiting sense, the scope of the invention being defined in the appended claims.

Referring to the drawings.

Figure 1:
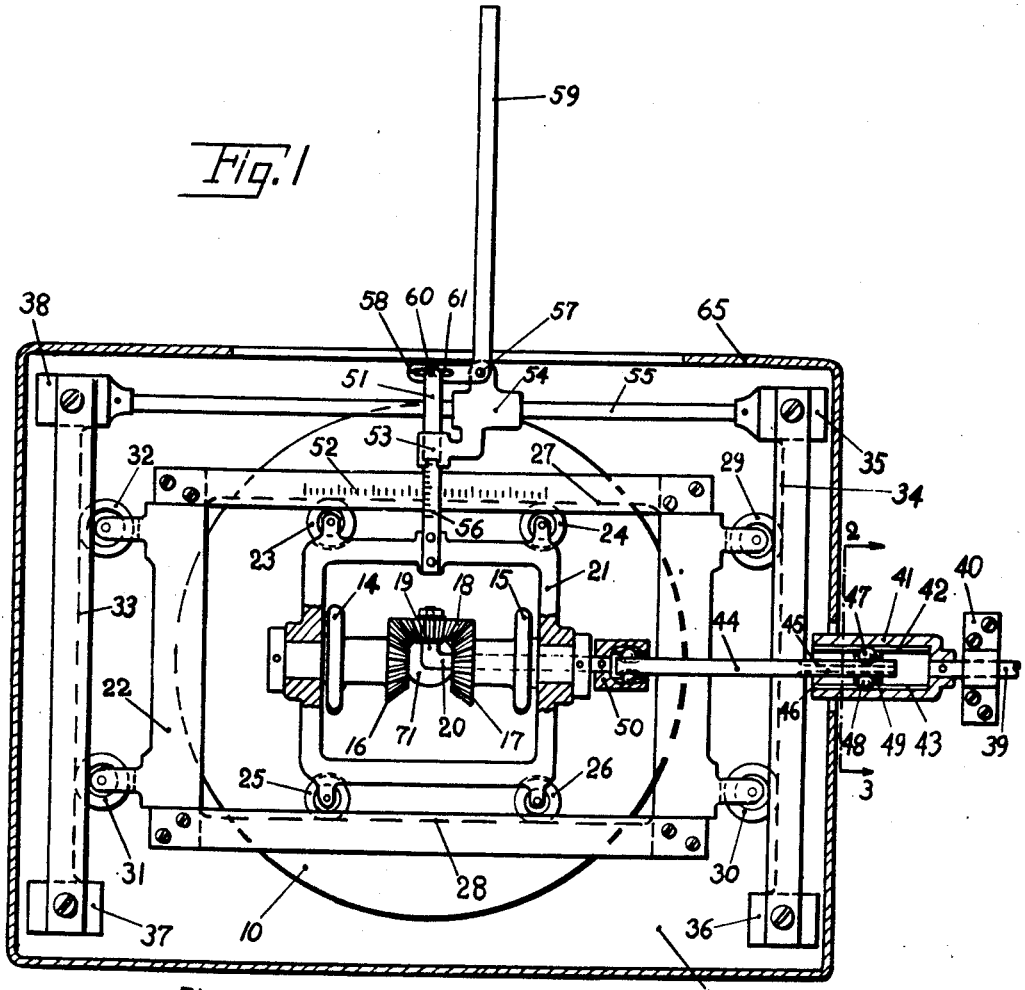
Fig. 1 is a plan view of a friction gear, more particularly for analysing accelerated motions.

A disk 10 (Figs. 1 and 2) supported in bearings 11 by a table 12 is rotatable by suitable means, such as a synchronous or variable speed motor, depending on the particular purpose for which the friction gear is to be used, as will be hereinafter explained. For connection with the motor, not shown in this drawing, a gear 13 is shown as secured to the hub of the disk.

Two friction wheels 14 and 15 are arranged to be in contact with the driving surface of the disk 10 to be driven thereby. It appears that the friction wheels arranged to engage the disk on opposite sides of a disk diameter will rotate in opposite direction. Means for transmitting the differential rotary motion of the friction wheels are shown in the form of a differential gear train, comprising bevel-gears 16 and 17 secured to, or integral with, the friction wheels 14 and 15, and a further bevel-gear 18 rotatable on the angled end 19 of a shaft 20.

The friction wheels are mounted for displacement in the direction of their axis of rotation and a direction normal thereto in a support. The support is shown as comprising a wheel bearing member or inner frame 21 and an outer member or frame 22. The inner frame 21 is provided with rollers 23, 24, 25 and 26 running in preferably V-shaped tracks 27 and 28 of the outer frame. The outer frame, in turn, has rollers 29, 30, 31 and 32 running in tracks 33 and 34 at right angles to the first-named tracks. The last-named tracks are supported at points 35, 36, 37 and 38, fixed relatively to the axis of rotation of the disk 10.

Figure 3:
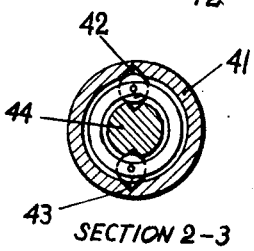
Fig. 3 is a cross section of a shaft coupling of the gear mechanism of Fig. 1, the section being taken on line 2—3.

For connection of the shaft 20 with a second shaft 39 rotatable in a fixed bearing 40 a shaft coupling is provided permitting axial and lateral movements of the two shafts relatively to each other. The shaft coupling, a cross section of which is shown in Fig. 3, is shown as comprising a hollow cylinder 41 secured to one shaft and having two preferably V-shaped longitudinal recesses 42 and 43 at the inside. An intermediate shaft 44 is provided with similar recesses 45 and 46 and connected to the cylinder by balls 47 and 48 guided in a cage 49. The other end of the intermediate shaft 44 may be connected in a similar way to a hollow cylinder 50 secured to the shaft 20.

The operation of the device, so far described, is as follows: Assuming the disk be driven at a uniform speed, it is clear that the shaft 20 will be rotated at a rate which is proportional to the axial displacement of the friction wheels from the center of the disk. In the position shown in Fig. 1 the speed of the shaft 20 will be zero. If the friction wheels are displaced normally to the direction of their axis of rotation the shaft 20 will be rotated at an increasing rate while the friction wheels run automatically without slipping or sliding towards the center or the edge of the disk, as the case may be. The first derivative of rotation of the shaft 20 with regard to time is the greater the greater the normal displacement. It may therefore be stated that the acceleration of the shaft is a function of the normal displacement.

Utilizing the above outlined characteristics of the friction gear, the same may be used for producing movements of a certain acceleration or retardation controllable by the normal displacement of the friction wheels.

Reversing the process it may now be assumed that the shaft 39, 44, 20 be driven at an unknown rate and acceleration which are desired to be determined or analysed. This may easily be accomplished due to the fact that the friction wheels will automatically assume a position on the disk which corresponds to the velocity and the acceleration of the rotation of the shafts. The magnitude of the respective velocity and acceleration may be determined by measuring the respective displacements by suitable means as will also be hereinafter described.

It is further possible to modify the motion of the shaft 20, respectively the displacement values of the friction wheels by imparting to the disk 10 a non-uniform speed, e. g. by driving it by a variable speed motor.

As the normal displacement of the friction wheels which is automatically followed by an axial displacement requires practically no force, the friction gear constitutes an ideal mechanism for producing from very slight controlling impulses relatively great force or movement impulses of a predeterminable characteristic. The present friction gear may therefore be used for mechanisms in which it is desired to produce certain and measurable accelerations.

Figure 2:
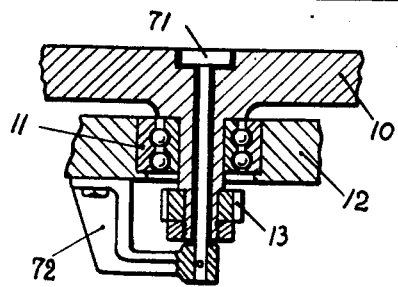
Fig. 2 is a sectional elevation of the center part of the disk of the gear shown in Fig. 1.

Indicating means may be provided for indicating the axial and normal displacements of the friction wheels. Such means are shown in Fig. 1 as being a bar 51 movable with the inner frame 21. The axial displacement representing the velocity value may be read at a scale 52 on the track bar 27 and associated with the left edge of the bar 51.

The bar 51 is guided in an arm 53 of a guide block 54, slidable on a stationary bar 55, thereby carrying the guide-block with the inner frame with it. Upon normal displacement of the friction wheels and the inner frame the bar 51 will move relatively to the arm 53. A scale 56 on the bar 51 and associated with a pointer or reading mark on the arm will therefore permit reading of the normal displacement representing the acceleration value.

On the guide block there is pivotally mounted at 57 a crank shaped lever having two arms 58 and 59. A pin 60 on the bar 51 engages a slot 61 of the one arm 58 of the lever. By means of the arm 59 the friction wheels may be normally displaced.

It is a disadvantage with friction gears having only one friction wheel that for positions of the friction wheel very close to the center of the disk, the wheel has the tendency of slipping, thereby introducing an uncontrollable error, especially disadvantageous, if the device is used for computing purposes.

To overcome this disadvantage two friction wheels are provided which constitute a differential drive. For even very slight displacements of the inner frame 21 from the zero position, in which the friction wheels are equidistant from the center of the disk, there will be no slipping of the wheels and correspondingly a correct position is obtained.

For large displacements which occasionally occur there is the disadvantage that one friction wheel may get so close to the center that an uncontrollable error is introduced. To overcome this disadvantage a stationary center part 71 shown as secured to the table 12 by means of a bracket 72 (Fig. 2) is provided.

A constant and determinable error will arise, when a friction wheel is moved onto the center part. This error, however, may easily be compensated for by a corresponding alteration of the respective section of the scale graduation.

Figure 4:
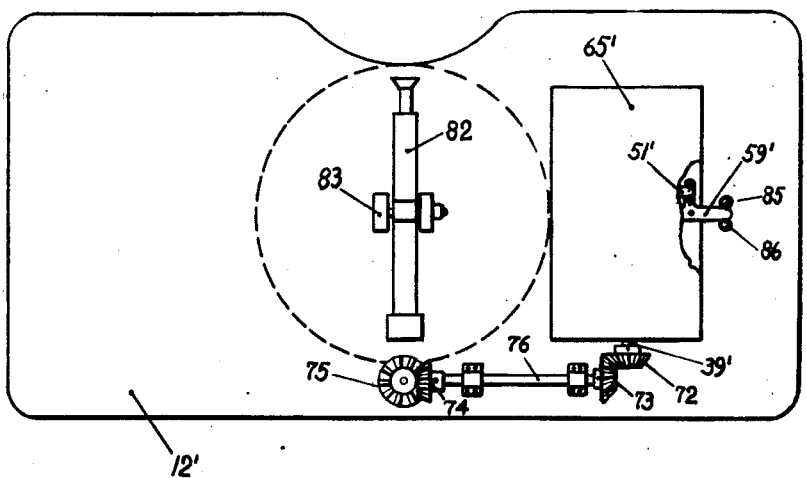
Fig. 4 is a plan view of a friction gear system.
Figure 5:
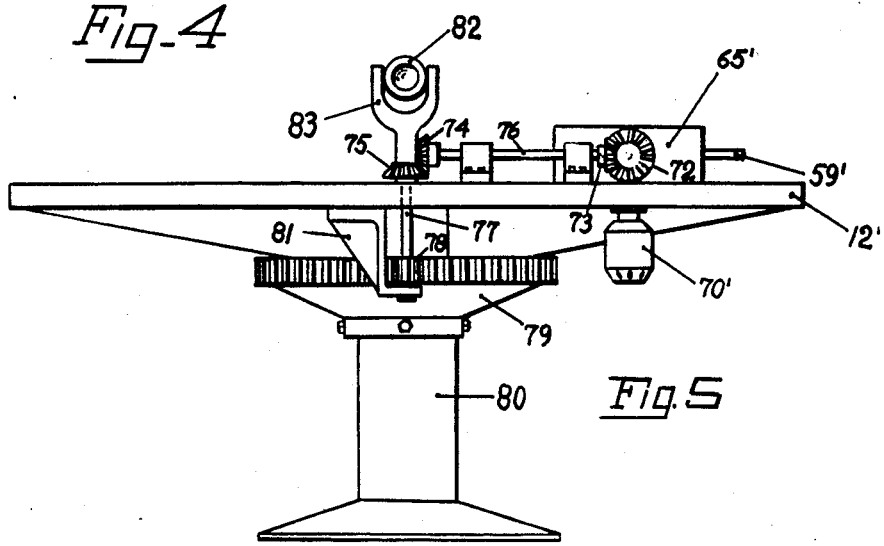
Fig. 5 is an elevation of the apparatus shown in Fig. 4.

In Figs. 4 and 5 the friction gear is shown as inclosed within the casing 65'. The friction gear is shown as arranged to turn the table 12' by means of a suitable driving connection, shown as comprising bevel gears 72 and 73, 74 and 75, the former connecting the shaft 39' to a shaft 76 and the latter connecting the shaft 76 to a shaft 77. The shaft 77 has a pinion 78 secured thereto meshing with a large gear 79 secured to a base or standard 80. A bearing 81 is provided for the shaft 77.

A viewing device, shown as being a telescope 82 is mounted in a support 83 which may be arranged fixed relatively to the table 12'. The disk 10 of the friction gear is driven by the motor 70'. Consequently the table 12' rotates together with the telescope, whereby the velocity and the acceleration of this rotation are given by the axial and normal displacement of the friction wheels. Assuming now a moving object be followed by turning the telescope 82, so that the object remains in the center of the view of the telescope, the control lever 59', which corresponds to the control lever 59 in Fig. 1, must be operated, in order to give the rotating table a suitable velocity and a suitable acceleration. By manually operating the controlling lever of the friction gear the table may then be caused to follow the movements of the object so that the object remains within the sight of the telescope. Because the normal displacement of the friction wheels by means of the control lever 59' requires practically no force only very slight controlling impulses are to be transmitted to the control lever.

Figure 6:
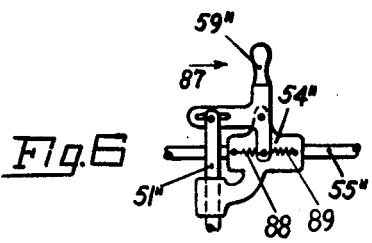
Fig. 6 is a modified form of control lever for the friction gear.

A modification is illustrated by Fig. 6. The guiding block 54" movable along the bar 55" carries an operating lever 59" for displacing the support which carries the friction wheels. In order to prevent that a manual force exerted in the direction of the arrow 87 causes the support to be displaced too great an amount, thereby accelerating the table 12' excessively, a resilient connection is provided between the lever 59" and the guiding block 54" shown as comprising two springs 88 and 89. The springs give the operator a certain "feel" for the control movements because the springs tend to maintain the support of the friction gear in a position, in which the axes of the friction wheels and disk are in one plane and the axial displacement is zero. If it is now desired to enlarge the normal displacement of the friction wheels, the control lever must be operated in such a direction, that the spring will be strained more and more.

Obviously the present invention is not restricted to the particular embodiments thereof, herein shown and described, moreover it is not indispensable that all the features of the invention be used conjointly, since they may be employed advantageously in various combinations and subcombinations.

What is claimed is:

1. A friction gear comprising, in combination, a rotatable disk; two coaxially arranged wheels frictionally engaging said disk on opposite sides of a disk diameter and rotating in opposite direction; means for mounting said friction-wheels at a predetermined distance from each other for turning about their axis, for axial displacement relatively to said disk and for displacement substantially normal to their axis of rotation; and means connected to be turned proportionally to the difference of the rotation of said friction-wheels.

2. A friction gear comprising, in combination, a rotatable disk; a support movable parallel to said disk in two directions normal to each other; two coaxially rotatable wheels mounted on said support for frictionally engaging said disk at a predetermined distance from each other and on opposite sides of a disk-diameter, thereby rotating in opposite direction; and means connected to be turned proportionally to the difference of the rotation of said wheels.

3. A friction gear comprising, in combination, a rotatable disk; a support movable parallel to said disk in two directions normal to each other; two coaxially rotatable wheels mounted on said support for frictionally engaging said disk at a predetermined distance from each other and on opposite sides of a disk-diameter, thereby rotating in opposite direction; and a differential gear connected to be turned proportionally to the difference of the rotation of said wheels.

4. A friction gear comprising, in combination, a rotatable disk; power means for rotating said disk; two axially arranged wheels frictionally engaging said disk on opposite sides of a disk diameter and rotating in opposite direction; means for mounting said friction-wheels at a predetermined distance from each other for turning about their axis, for axial displacement relatively to said disk and for displacement substantially normal to their axis of rotation; means connected to be turned proportionally to the difference of the rotation of said friction-wheels and means connected to displace said friction-wheels normally to their axis of rotation, whereby the friction-wheels are caused to move axially, driving said differentially turned means at an increasing rate.

5. A friction gear comprising, in combination, a rotatable disk; power means for rotating said disk; a support movable parallel to said disk in two directions normal to each other; two coaxially rotatable wheels mounted on said support for frictionally engaging said disk at a predetermined distance from each other and on opposite sides of a disk diameter, thereby rotating in opposite direction; means connected to be turned proportionally to the difference of rotation of said wheels; and controlling means connected to displace said support normally to the wheel axis, whereby the friction-wheels are caused to move axially, driving said differentially turned means at an increasing rate.

6. A friction gear comprising, in combination, a rotatable disk; power means for rotating said disk; a support movable parallel to said disk in two directions normal to each other; two coaxially rotatable wheels mounted on said support for frictionally engaging said disk at a predetermined distance from each other and on opposite sides of a disk diameter, thereby rotating in opposite direction; a differential gear connected to be turned proportionally to the difference of the rotation of said wheels; and controlling means connected to displace said support normally to the wheel axis, whereby the friction-wheels are caused to move axially, driving said differential gear at an increasing rate.

7. A friction gear comprising, in combination a rotatable disk; power means for rotating said disk; a support movable parallel to said disk in two directions normal to each other; two coaxially rotatable wheels mounted on said support for frictionally engaging said disk at a predetermined distance from each other and on opposite sides of a disk diameter, thereby rotating in opposite direction; a differential gear connected to be turned proportionally to the difference of the rotation of said wheels; controlling means connected to displace said support normally to the wheel axis, whereby the friction-wheels are caused to move axially, driving said differential gear at an increasing rate; and resilient means acting on said support and tending to maintain the same in a position in which the axes of the wheels and the disk are in one plane and the axial displacement is zero.

GUSTAV NEUHAUS.